(12) United States Patent
Rope et al.

(10) Patent No.: US 10,382,125 B2
(45) Date of Patent: Aug. 13, 2019

(54) CLOSED LOOP MODULE CONTROL FOR COMMUNICATION

(71) Applicant: INPHI CORPORATION, Santa Clara, CA (US)

(72) Inventors: Todd Rope, Santa Clara, CA (US); Radhakrishnan L. Nagarajan, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 16 days.

(21) Appl. No.: 15/411,914

(22) Filed: Jan. 20, 2017

(65) Prior Publication Data
US 2018/0212712 A1 Jul. 26, 2018

(51) Int. Cl.
H04B 10/079 (2013.01)
H04B 10/40 (2013.01)
H04L 1/00 (2006.01)

(52) U.S. Cl.
CPC ....... H04B 10/07953 (2013.01); H04B 10/40 (2013.01); H04L 1/0047 (2013.01)

(58) Field of Classification Search
CPC .................................... H04B 10/075–0799
USPC ......................................................... 398/162
See application file for complete search history.

(56) References Cited

U.S. PATENT DOCUMENTS

| | | | | |
|---|---|---|---|---|
| 8,649,686 | B1* | 2/2014 | Booth | H04B 10/0795 398/140 |
| 9,337,993 | B1* | 5/2016 | Lugthart | H04L 7/033 |
| 2004/0037569 | A1* | 2/2004 | Kamalov | H04B 10/07953 398/162 |
| 2009/0196602 | A1* | 8/2009 | Saunders | H04B 10/5053 398/26 |
| 2010/0080562 | A1* | 4/2010 | Perkins | H04J 14/0227 398/98 |
| 2012/0281234 | A1* | 11/2012 | Matsui | G02B 6/29355 356/478 |
| 2014/0161444 | A1* | 6/2014 | Lin | H04B 10/0773 398/28 |
| 2014/0233943 | A1* | 8/2014 | Yamakami | H04J 14/0221 398/34 |
| 2014/0308034 | A1* | 10/2014 | Chung | H04B 10/07953 398/26 |
| 2018/0316527 | A1* | 11/2018 | Li | H04L 27/06 |

* cited by examiner

*Primary Examiner* — Casey L Kretzer
(74) *Attorney, Agent, or Firm* — Richard T. Ogawa; Ogawa P.C.

(57) ABSTRACT

The present invention is directed to communication systems and methods. According to an embodiment, a receiving optical transceiver determines signal quality for signals received from a transmitting optical transceiver. Information related to the signal quality is embedded into back-channel data and sent to the transmitting optical transceiver. The transmitting optical transceiver detects the presence of the back-channel data and adjusts one or more of its operating parameters based on the back-channel data. There are other embodiments as well.

15 Claims, 4 Drawing Sheets

CLOSED LOOP MODULE CONTROL FOR COMMUNICATION

CROSS-REFERENCES TO RELATED APPLICATIONS

Not Applicable

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to communication systems and methods.

Over the last few decades, the use of communication networks exploded. In the early days of the Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. To move a large amount of data, optical communication networks are often used.

With high demand for communication networks came high demand for quality networking devices. In high-speed communication systems, having optimized optical transceivers can meaningfully improve performance. For example, various parameters of optical transmitter, such as bias voltages for modulator and laser devices, can be adjusted and optimized in a communication system for improved performance.

Over the past, there have been various techniques for optimizing parameters and settings for optical transceivers. Unfortunately, existing techniques are inadequate for reasons explained below. Improved methods and systems for optimizing optical communication devices are desired.

BRIEF SUMMARY OF THE INVENTION

The present invention is directed to communication systems and methods. According to an embodiment, a receiving optical transceiver determines signal quality for signals received from a transmitting optical transceiver. Information related to the signal quality is embedded into back-channel data and sent to the transmitting optical transceiver. The transmitting optical transceiver detects the presence of the back-channel data and adjusts one or more of its operating parameters based on the back-channel data. There are other embodiments as well.

According to an embodiment, the present invention provides an optical transceiver apparatus, which includes an optical receiver for converting incoming optical signals to incoming electrical signals. The apparatus includes a digital signal processor (DSP) that is configured to analyze the incoming electrical signals and to generate a first signal quality value characterizing the incoming electrical signals. The apparatus also includes a forward-error correction (FEC) module that is configured to process the incoming electrical signal and to generate a second signal quality value characterizing an error rate associated with the incoming electrical signals. The apparatus further includes a control module that is configured to generate back-channel data based at least on the first signal quality value and the second signal quality value. The control module further is configured to insert the back-channel data to an outgoing data stream. The apparatus also includes an optical transmitter for generating output optical signals based on the outgoing data stream.

According to another embodiment, the present invention provides an optical communication system. The system includes an optical communication link. The system also includes a first transceiver comprising a first control module and a first optical transmitter. The system additionally includes a second transceiver comprising a second control and a second optical transmitter. The second transceiver is configured to send data to the first transceiver. The first transceiver is configured to process a first data stream received from the second transceiver and to detect a first back channel data. If the first transceiver detects the first back channel data, the first transceiver is configured to determine signal characteristics information associated with the first data stream and insert the signal characteristic information into a second back channel data. The second back channel data is embedded in a second data stream. The second transceiver is configured to process the second data stream received from the first transceiver. The second transceiver is configured to detect the second back channel data and adjusts one or more operating parameters based on the signal characteristic information.

According to yet another embodiment, the present invention provides a method for optimizing optical communication. The method includes transmitting a first data stream from a first optical transceiver to a second optical transceiver via an optical communication link. The method also includes detecting a first back-channel data segment at the first data stream by the second optical transceiver. The method additionally includes determining a first set of measurements associated with the first data stream by the second optical transceiver. The method additionally includes generating a second back-channel data by the second optical transceiver. The second back-channel data include the second set of measurements. The method also includes inserting the second back-channel data to a second data stream by the second optical transceiver. The method additionally includes transmitting the second data stream from the second optical transceiver to the first optical transceiver. The method further includes detecting the second back-channel data by the first optical transceiver. The method also includes determining a first set of adjustments by the first optical transceiver based on the first set of measurements. The method further includes applying the first set of adjustments to an optical transmitter by the first optical transceiver.

It is to be appreciated that embodiments of the present invention provide many advantages over conventional techniques. Among other things, by measuring actual signal characteristics by a receiving optical transceiver of the data communication path, adjustments made by a transmitting optical transceiver improve data transmission quality better than existing techniques, where typically one-time factory settings are applied to optical transceivers. For example, adjustments such as wavelength control may be specific to the optical link and actual operating conditions (e.g., temperature, interference, etc.), which are information unavailable when optical transceivers were manufactured. It is therefore advantageous for the closed loop techniques provided by the present invention to use these information and hence improved performance.

Embodiments of the present invention can be implemented in conjunction with existing systems and processes. For example, the back-channel data can be implemented to be compatible with existing communication protocols. Back-channel data are used by optical transceivers that are preconfigured to use them, and optical transceivers that are not configured to use the back-channel data may simply ignore them. In addition, optical transceivers according to embodiments of the present invention can be manufactured using existing manufacturing equipment and techniques. In certain implementations, existing optical transceivers can be upgraded (e.g., through firmware update) to take advantage of the present invention. There are other benefits as well.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
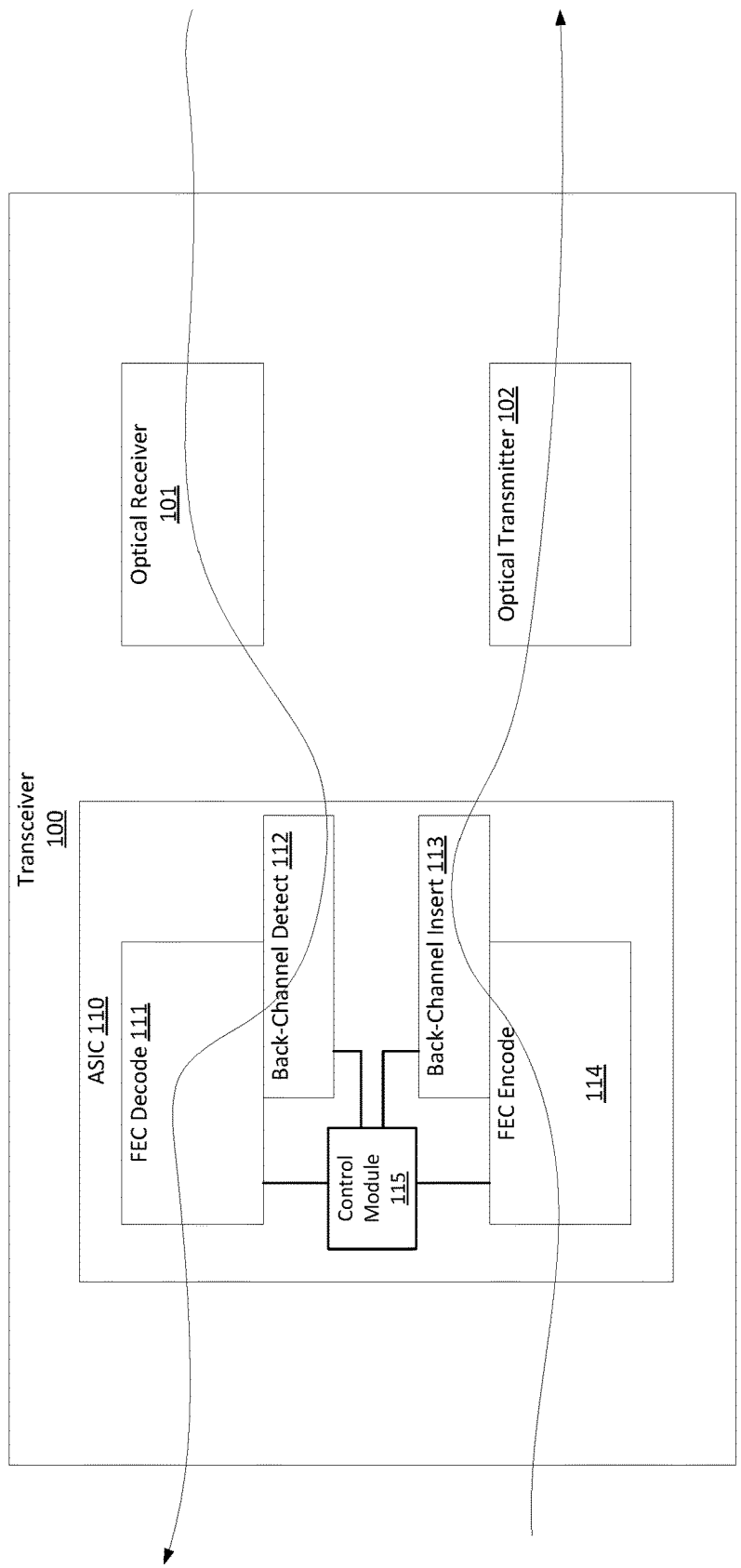
FIG. 1 is a simplified diagram illustrating optical transceiver according to an embodiment of the present invention.

The present invention is directed to communication systems and methods. According to an embodiment, a receiving optical transceiver determines signal quality for signals received from a transmitting optical transceiver. Information related to the signal quality is embedded into back-channel data and sent to the transmitting optical transceiver. The transmitting optical transceiver detects the presence of the back-channel data and adjusts one or more of its operating parameters based on the back-channel data. There are other embodiments as well.

Most optical communication modules have some form of internal control systems to maintain the optical performance. For example, typical control parameters include optical power, wavelength, extinction ratio, and/or others. However, in most cases, conventional techniques for the transmitting optical module to maintain these parameters rely on proxy measurements. For example, transmitted optical power may be measured by a tap and photodiode, or extinction ratio may be inferred from a modulator bias. Unfortunately, these conventional techniques are inadequate. A difficulty is that these proxy measurements may not represent the actual transmission characteristics, and as a result the transmitting optical path is not optimized.

In optical communication, another difficulty is that in an optical line system (including fiber optics, amplifiers, multiplexers/de-multiplexers, dispersion compensation, etc.), optimal transmission parameters may not be constant and may in fact change due to the line equipment or conditions. This may render the transmission parameters even farther from optimal.

It is to be appreciated that embodiments of the present invention provide advantages over existing techniques. More specifically, embodiments of the present invention make use of digital signal processors (DSP) and forward error correction (FEC) modules on the optical receive path. The inclusion of a DSP and FEC on the optical receive path within the module itself allows the receiving side to determine the quality of the incoming optical signal. Additionally, embodiments of the present invention provide an advanced FEC encoding that includes the ability to place additional digital information alongside the transmitted data ("back-channel"), thereby allowing the receive-side module to inform the transmitting-side module of the current signal integrity.

With DSP/FEC and advanced FEC encoding working together, a closed-loop system can be implemented, where the optical parameters of the transmit side can be tuned to optimally to reflect the current optical conditions. The tuning parameters include, but not limited to, compensating for aging or environmental effects of optical equipment from the transmitting optical module through to the receiving optical module.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram illustrating optical transceiver according to an embodiment of the present invention. This diagram is merely an example, which should not unduly limit the scope of the claims. One of ordinary skill in the art would recognize many variations, alternatives, and modifications. As shown in FIG. 1, transceiver 100 includes an optical receiver 101 that interfaces with an optical communication link and is configured to receive and process optical communication signals. In various embodiments, optical receiver includes various components, such as filter, transimpedance amplifier (TIA), fiber optic connectors, and others. Optical receiver 101 may additionally include optical transmission devices such as optical amplifiers, optical attenuators, chromatic dispersion compensation (static or tunable), lengths of fiber, patch panels and patch cables, optical multiplexers, optical de-multiplexers, etc. Among other features, optical receiver 101 converts received optical signals to electrical signals that can later be processed. The electrical signals are then processed by various digital signal processors (DSP). For example, application specific integrated circuit (ASIC) 110 includes FEC decoder 111 and a back-channel detector 112.

It is to be appreciated that once back-channel data are detected from the incoming data stream, it is determined that the source of the received optical signals is compatible with the use of back-channel data for adjusting its operating parameters. In various embodiments, the use of back-channel data is a part of a predetermined communication protocol that two or more transceivers use. If back-channel data is not detected from the received optical signals, the source of the received optical signals is not equipped to utilize back-channel data, and it would be unnecessary and even wasteful to perform signal measurements that are to be embedded into back channel data.

ASIC 110 may also include a module for measuring and analyzing signal integrity of the received signal (i.e., electrical signals converted from the received optical signals). Signal integrity may be evaluated in various signal measurements that include, but are not limited to overall signal-to-noise ratio (SNR), individual PAM-4 level SNR, overall PAM-4 histogram, optical eye diagram, and/or others. In additional to signal integrity, data error rate associated with the incoming signal may be evaluated as well. For example, FEC decoder 111 determines error rate before performing error recovery. More specifically, FEC decoder 111 has the ability to calculate a bit error ratio (BER) prior to FEC error recovery. Depending on the implementation, BER can be calculated in several different ways, such as overall BER, individual lane BER, individual PAM-4 level BER (i.e., MSB BER, LSB BER), bit-transition error matrix (e.g., in PAM-4, BER for 0->1, 0->2, 0->3 and all other level transitions), and/or other ways.

The back-channel detection module 112 is configured to detect whether the received signals include back-channel data that can be used to optimize data transmission performance. For example, the back-channel data are embedded by the source of the received signals (e.g., another optical transceiver or communication apparatus). In various embodiments, the back-channel detection module 112 is coupled to a control module 115. The control module 115 is configured to adjust various operating and transmission parameters of transceiver 100 based on the back-channel data. For example, operating parameters include temperature, bias settings, multiplexer settings, wavelength, and others, which are described below. It is to be appreciated that the back-channel detection module 112 may be implemented as a part of the closed feedback loop (e.g., between two optical transceivers). That is, data are transmitted to a second transceiver over an optical communication link. The second transceiver includes DSP and FEC module that measure the signal quality (e.g., SNR) and data quality (e.g., BER), and the measurement results are embedded in the back-channel data that are transmitted back to transceiver 100. The back-channel detection module 112 detects the existence of the back-channel data, which are used by the control module 115 to adjust operating parameters of transceiver 100. Depending on the operating condition and specific implementation, there could be iterations of processes for changing parameters, receiving back-channel data reflecting the signal quality associated with the changed parameters, and changing parameters again.

It is to be appreciated that, as explained below, back-channel data can be used to adjust not only transmitter parameters for outgoing data, but also receiver parameters for processing incoming data. For example, back channel data can be used to adjust how incoming optical signals are processed.

In various embodiments, control module 115 stores near-end parameters, which may be determined at the time when the transceiver 100 is manufactured. Control module 115 analyzes the received back-channel data, which reflects the actual conditions of data transmission, and the adjustment of operating parameters can be modifying the existing parameter based on the existing near-end parameters. In various embodiments, adjustment of operating parameters involves synchronizing and using both existing near-end data and the back-channel data that reflects conditions for actual data communication.

Transceiver 100 includes an FEC encoder 114 and a back-channel insertion module 113 as shown. For example, the FEC encoder 114 and the back-channel insertion module 113 are implemented as a part of the ASIC 110. It is to be understood that while FEC decoder 111 and FEC encoder 114 are shown as two functional blocks in FIG. 1, FEC decoder 111 and FEC encoder 114 may be implemented a single FEC module. Similarly, back-channel detection module 112 and the back-channel insertion module 113 can be implemented as single back-channel module.

FEC encoder 114 is configured to perform FEC encoding for electrical signals that are to be transmitted through the optical transmitter 102. For example, FEC encoder 114 is configured to perform different types of error correction. Back-channel insertion module 113 is configured to insert back-channel data into the outgoing data stream that is to be transmitted. As explained above, back-channel data include information regarding the quality of received data, which pertains to transmission parameters and settings of the transmitting transceiver that sends data to transceiver 100. It is to be appreciated that the back-channel insertion module is capable of inserting and/or detecting, with high fidelity, additional digital information alongside and without interfering with the transmitted data. For example, a predefined segment of outgoing data stream is used to embed the back-channel data.

In FIG. 1, a close loop technique is used for optical communication, with an optical transmitter and an optical receiver. It is to be understood that close loop techniques that use back-channel for optimizing data communication can be used in other types of communication links as well, such as existing communication lines with copper wires and/or other mediums.

Figure 2:
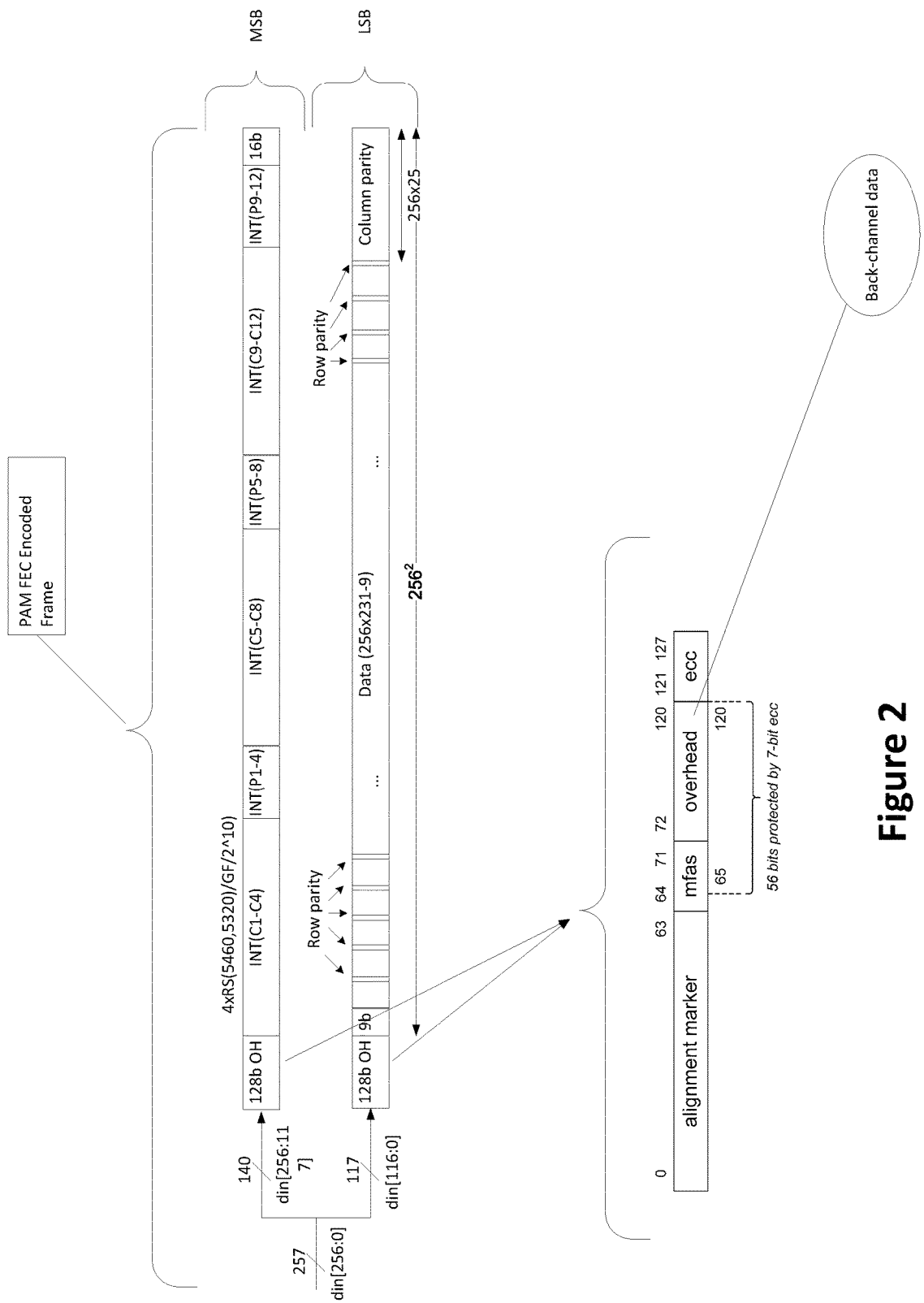
FIG. 2 is a simplified diagram illustrating an encoded data frame according to embodiments of the present invention.

FIG. 2 is a simplified diagram illustrating an encoded data frame according to embodiments of the present invention. This diagram is merely an example, which should not unduly limit the scope of the claims. One of ordinary skill in the art would recognize many variations, alternatives, and modifications. As shown in FIG. 2, an exemplary FEC encoded frame can be divided into a most significant bits (MSB) section and a least significant bits (LSB) section. Both the MSB section and the LSB section include their own respective headers. For example, the headers are 128 bits long. A header is then subdivided into alignment marker region (0-63 bits), "mfas" region (64-71 bits), overhead region (72-120 bits), and "ecc" region (121-127 bits). It is to be appreciated that overhead region stores back-channel data, which includes information related to quality (e.g., measured and/or calculated) of received signals. For example, an optical transceiver that is not equipped to take advantage of the back-channel data can simply ignore and skip over the back-channel region.

Now referring back to FIG. 1. Outgoing electrical signals are converted to optical signals and transmitted by the optical transmitter 102. For example, optical transmitter 102 includes one or more lasers devices (e.g., laser diode with cooling), one or more modulators. Additionally, optical transmitter 102 may include multiplexing and optical control blocks. Implementation and operating parameters of optical transmitter 102 usually have significant impact on signal quality and data transmission performance of the outgoing data stream. By adjusting operating parameters and settings of optical transmitter 102, signal quality and data transmission performance can be improved and optimized. While operating parameters and settings can be optimized initially at the factory, being able to adjust these parameters and settings based on actual signal measurements is better, since actual signal measurements reflect true operating conditions (e.g., fiber optic lines, interference, temperature, etc.).

According to various embodiments, the control module 115 of the transceiver 100 processes the received back-channel data, which include actual measurements of data quality as measured by a second transceiver that receives data from transceiver 100. The control module 115 then determines the optical parameters and settings accordingly. For example, operating parameters and settings may include, but not limited to, the following:

Laser temperature setting (or TEC current if directly controlled)
Laser bias current
Modulator bias setting (e.g., heater power setting if a thermo-optically controlled MZM)
Multiplexer offset bias setting (e.g., heater power setting if a thermo-optically controlled DLI)

Figure 3:
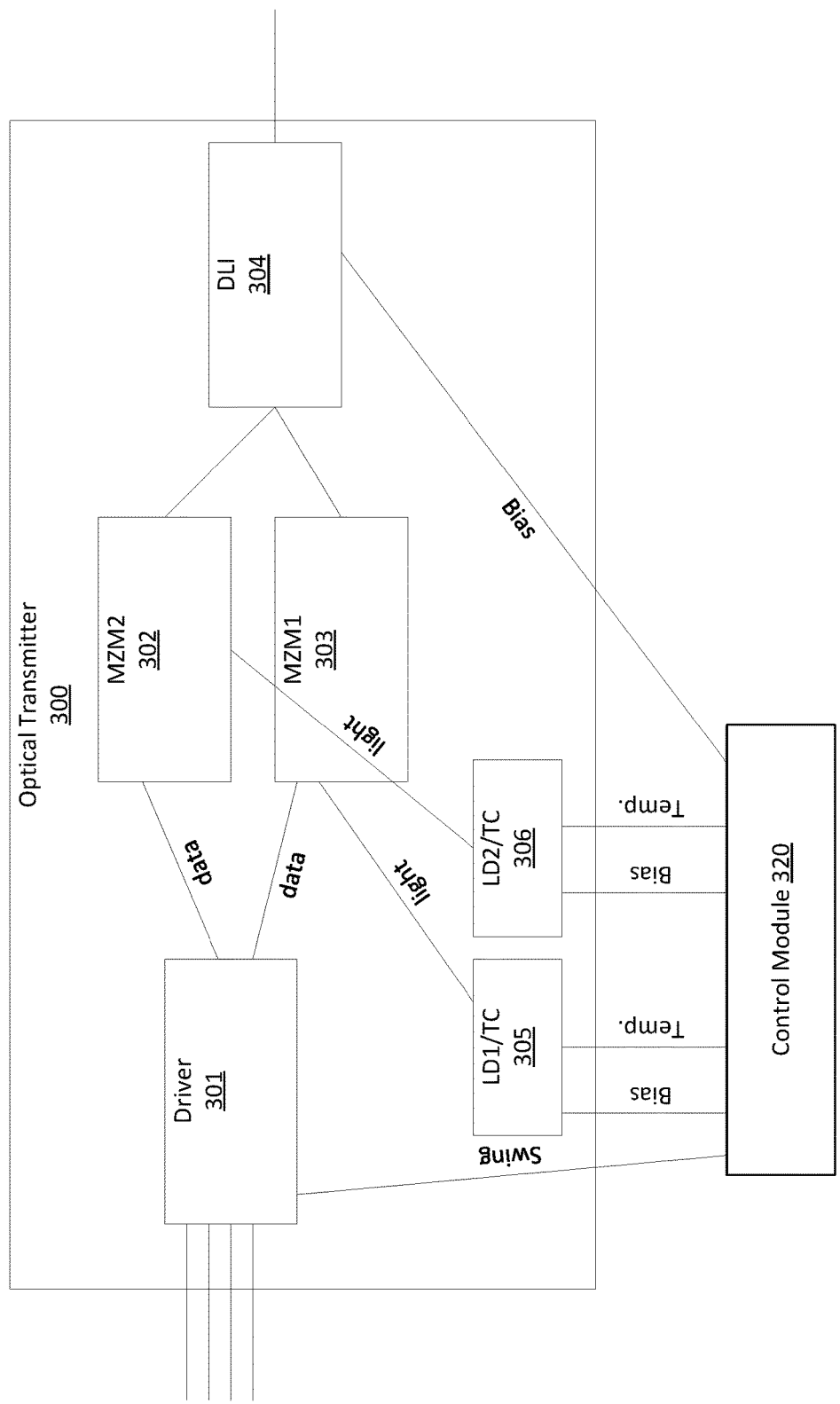
FIG. 3 is a simplified diagram illustrating an optical transmitter with back-channel data control according to embodiments of the present invention.

As an example, back-channel data provides signal quality information that can be used to adjust parameters of laser devices. More specifically, laser devices used for optical data transmission may be controlled using temperature and bias control parameters. FIG. 3 is a simplified diagram illustrating an optical transmitter with back-channel data control according to embodiments of the present invention. This diagram is merely an example, which should not unduly limit the scope of the claims. One of ordinary skill in the art would recognize many variations, alternatives, and modifications. As shown in FIG. 3, driver 301 that generates driver signal based on outgoing data can be adjusted by a voltage swing parameter. Similarly, modulators 302 and 303 may be adjusted using settings such as RF amplitude, DC bias, and/or others. For example, modulators 302 and 303 may be implemented using Mach-Zehnder modulators (MZM). Light source for optical transmitter 300 includes laser diodes 305 and 306. For example, laser diodes can be adjusted by changing laser bias and/or laser temperature. Similarly, delay line interferometer (DLI) 304, which functions as an optical multiplexer, can be adjusted with an offset bias. It is to be appreciated that the control module 320 of optical transmitter 300 can use the back-channel data to determine which parameters (as listed above) are to be adjusted. For example, the control module 320 has a control interface that provides control signals for the abovementioned parameters such as bias control, temperature control, swing voltage, and others.

According to an embodiment, back-channel data are used as a part of optical receiver. As an example, optical receiver 101 is a part of the transceiver 100 as shown in FIG. 1, and various operating parameters of optical receiver 101 may be adjusted based on back channel data.

Figure 4:
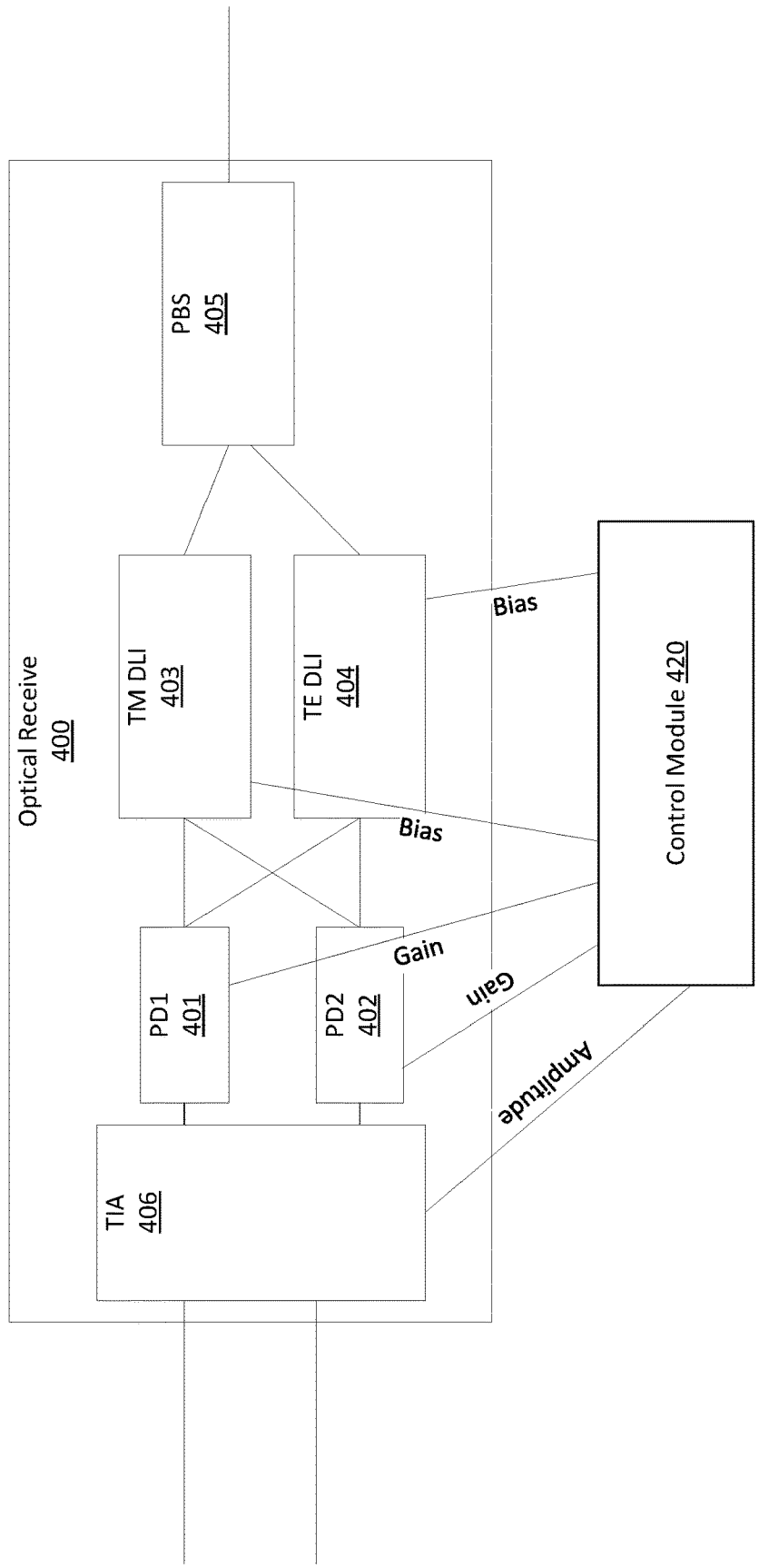
FIG. 4 is a simplified diagram illustrating an optical receiver 400 according to an embodiment of the present invention.

FIG. 4 is a simplified diagram illustrating an optical receiver 400 according to an embodiment of the present invention. This diagram is merely an example, which should not unduly limit the scope of the claims. One of ordinary skill in the art would recognize many variations, alternatives, and modifications. Optical receiver 400 includes polarization beam splitter (PBS) 405 that splits the received optical signal for processing. The received optical signal is then processed by optical multiplexers 403 and 404. For example, multiplexers 403 and 404 comprise DLI devices that can be adjusted using bias settings. For thermal-optically controlled DLIs, heater power settings may be used to adjust DLI operations. Multiplexers 403 and 404 are coupled to photodetectors 401 and 402, whose current gain settings can be adjusted. For example, photodetectors may be amplified, and thus gain settings are needed. For example, avalanche photodiodes can be adjusted by changing its photocurrent gain. The outputs of photodetectors 401 and 402 are coupled to TIA 406, which generates electrical signal based on the received optical signals. Depending on the implementation, various parameters such as amplitude, gain, and/or bandwidth, can be adjusted based on back-channel data. As mentioned above, a control module 420 may be used to process received back-channel data and generates control signals to adjust these parameters.

To make use of back-channel data and to generate control signals for changing operating parameters, a control module can be used. For example, abovementioned control modules 420 may be implemented as a part of a computer engine block, or a microcomputer that is a part of optical transceiver ASIC. To use the transceiver 100 as an example, the control module is configured with the back-channel insertion module 113 to insert digital signals alongside the transmitted optical data, which describe the integrity of the received optical signal (as measured by DSP and/or FEC modules). Additionally, the control module is able to use the back-channel detector 112 to detect back-channel data embedded in the received signals. Once detected, the control module processes the back-channel data and generates control signals accordingly. The control signals are used to adjust various operating parameters of the transceiver (e.g., optical receiver, optical transmitter, etc.). Additionally, operating conditions of the optical transceiver may change (e.g., interference, optical line quality, temperature change, etc.). By using back-channel data, the control module adjusts and optimizes transceiver performance accordingly. Since the back-channel data are shared between two or more transceivers, two transceivers form a feedback loop for optimizing data transmission over a communication link.

In an exemplary embodiment, back-channel data are used to adjust, among other parameters, transmitting wavelength. In a DWDM system, for example, the transmitting wavelength is an important parameter. In certain implementations, transmitting wavelength can be controlled via carefully tuning the temperature of a thermally tuned laser. However, the actual frequency may not match the measured temperature of the laser. More specifically, temperature and wavelength for the same laser device may change over time as a part of laser device aging process. As a result, the thermal gradient of a laser device at the beginning of life calibrations, typically due to aging, becomes inaccurate over an extended period of time. Furthermore, since laser devices generate heat, depending on the packaging and/or placement of the laser device, adjusting laser devices in actual operating condition. For example, thermal gradients are involved with either self-heating or environmental temperature interference.

In various embodiments, the control module is positioned on the data transmission path. For example, the wavelength of the light is measured using Fabry-Pérot interferometer (or etalon) type of device. It is to be appreciated that even small changes in frequency and/or wavelength can have significant impact on the signal integrity of the transmitted data. For example, in various embodiments of the present invention, characteristics of the received signal (e.g., SNR, BER, Eye-Level parameters, etc.) are passed from a receiving optical transceiver back to the transmitting optical transceiver. The transmitting optical transceiver then adjusts the frequency of its one or more lasers and wait for confirmation of whether an improvement has been made, or the signal has gotten worse, thereby forming a closed feedback loop for optimizing signal transmission. The transmitting optical transceiver can try many frequencies (in the right direction) to obtain optimal frequencies of the one or more lasers.

Below is a simplified process for adjusting optical transceivers according to embodiments of the present invention, the process including the following steps:

1. At the receiver, measure a bit-error rate BER ("b11") corresponding to conditions at transmitter temperature setting 1 ("t1") and transmitter temperature setting 2 ("t2"), and the receiver uses a predefined back-channel to transmit data back to the transmitting module;
2. At the transmitting module, modify transmission parameter with step t1 by an amount approximately equal to 0.5 GHz;
3. At the receiving module, measure BER ("b21") and use the back channel to transmit back to the transmitting module;
4. At the transmitting module, modify transmission parameter with step t2 by an amount approximately equal to 0.5 GHz;
5. At the receiving module, measure BER ("b12") and use the back channel to transmit back to the transmitting module;
6. At the transmitting module, calculate values d1 and d2 (which are changes to be made to temperature t1 and t2) with the following equations:

a. $d1 = g*(1 - b21/b11)$ b. $d2 = g*(1 - b12/b11)$

7. At the transmitting module, adjust t1->t1+d1 and t2->t2+d2; and
8. Repeat from step 1 as needed, until an acceptable BER is obtained at the new t1 and t2 settings.

It is to be noted that steps 1-3 and 4-5 are performed in a changing order to remove unrelated monotonic effects from the system.

It is to be appreciated the back-channel data can also be used to provide modulator bias control. Among other things, the bias point of the modulator needs to be maintained at the proper value to provide an optimized extinction ratio. In some cases, the optimal bias point is not at quadrature but rather at a point off-quadrature. Often, a fixed bias point is used, which based on for worst-case line system conditions. In various embodiments, characteristics of the received signal (including SNR, BER, Eye-Level parameters, etc.) are measured by the receiving module, embedded into back-channel data, and to the transmitting module. The transmitting module adjusts the modulator bias point based on the back-channel data, and waits for indication (embedded in the back-channel data) from the receiving module as a feedback for the next iteration of adjustment. In this way, the transmitting module can continuously seek the optimal modulator bias point until a predetermined threshold performance level is obtained.

The back-channel data in closed feedback loop can also be used for adjusting multiplexer bias settings. For example, in a silicon photonics based multi-wavelength module design, a delay line interferometer (DLI) may be used to multiplex two optical wavelengths onto the same transmitting optical fiber. To optimize performance, center frequency of the DLI needs to be carefully controlled to optimally pass or separate both wavelengths.

In an exemplary embodiment, the characteristics of the received signal (e.g., SNR, BER, Eye-Level parameters, etc.) from a transmitting module are measured by a receiving module, which inserts the signal characteristic information into back-channel data. The back-channel data is then transmitted to the transmitting module, along with other data. The back-channel data is then processed by the transmitting module. The transmitting module adjusts the DLI center frequency based on the signal characteristics provided in the back-channel data, and transmits data to the receiving module with new DLI bias setting, and waits for signal characteristics information from the receiving module. The feedback loop between the transmitting module and the receiving module operates a number of iterations until certain predetermined conditions are met. For example, predetermined conditions may include a predetermined number of iterations, the total amount of adjustment/calibration time, and/or predetermined signal characteristics.

In certain embodiments, near-end tuning (e.g., in combination with bias setting) of DLIs are adjusted using the closed-loop back channel data.

Additional parameters and settings of optical transceivers can be adjusted using back-channel data. For example, characteristics of the received signal (e.g., SNR, BER, Eye-Level parameters, etc.) are measured by a receiving module and inserted to the back-channel data as a part of the closed feedback loop. The transmitting module then uses the back-channel data to adjust its operating parameters and settings, which include, but not limited, the following:

Modulator swing (RF amplitude);
Laser bias (i.e., Automatic Power Control);
PAM-4 level optimization (in this case the histogram calculated by the receiver can be used to optimize the level amplitude settings);

PAM-4 MSB/LSB lane skew; and/or

Relative transmitted power among one or more lasers sharing the same optical fiber.

For example, by adjusting relative transmitted power among one or more lasers, optical SNR (OSNR) within a channel group can be adjusted to optimize the overall BER. For example, in a 2-channel 100G system, the launch power and OSNR can be optimized for 100G BER and still keep the total transmitted optical power (CH1+CH2 power) constant.

In certain embodiment, in addition to using the back-channel to transmit data from the receiving module to the transmitting module, the SNR and BER can be used to optimize near-end parameters, which includes but not limited to:

TIA output amplitude, gain or bandwidth control;
Photodiode gain (e.g., in an APD); and/or
Receiver de-multiplexer center frequency control (i.e., for a silicon photonics DLI demux)

In various implementations, two or more parameters of an optical transceiver may be adjusted, and when doing so, priority or preference may be given to parameters such as far end TX wavelength tuning over near end RX DLI tuning. For certain parameters, such as far end transmission MSB/LSB and far PAM 4 swing settings, it may be advantageous to perform optimization in parallel.

It is to be appreciated that different types of algorithms may be implemented to take advantage of the feedback mechanisms involving back-channel data. For example, a transmitting transceiver keeps adjusting its operating parameters based on the measured signal characteristics provided by the receiving transceiver until a threshold level of performance is obtained. In certain implementation, optical transceivers perform quality continuously and as long as they operate. There are other implementations as well.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An optical transceiver apparatus comprising:
   an optical receiver for converting incoming optical signals to incoming electrical signals;
   a digital signal processor (DSP) configured to analyze the incoming electrical signals and to generate a first signal quality value characterizing the incoming electrical signals;
   a forward-error correction (FEC) module configured to process the incoming electrical signals and to generate a second signal quality value characterizing an error rate associated with the incoming electrical signals;
   a control module configured to generate back-channel data based at least on the first signal quality value and the second signal quality value, the control module further being configured to insert the back-channel data to an outgoing data stream, the back channel data segment being positioned at a predetermined location of an encoded data frame for processing by a compatible device; and
   an optical transmitter for generating output optical signals based on the outgoing data stream,
   wherein the outgoing data stream indicates a first pulse amplitude modulation (PAM) parameter adjustment comprising lane skew.

2. The apparatus of claim 1 wherein the FEC module is configured to decode the incoming electrical signals.

3. The apparatus of claim 1 wherein the FEC module is configured to encapsulate the back-channel data and a portion of the outgoing data stream into an FEC frame.

4. The apparatus of claim 1 wherein the first signal quality value comprises a signal-to-noise ratio.

5. The apparatus of claim 1 wherein the first signal quality value is associated with a histogram.

6. The apparatus of claim 1 wherein the first signal quality value comprises an optical eye diagram.

7. The apparatus of claim 1 wherein the error rate comprises an overall bit-error rate (BER).

8. The apparatus of claim 1 the second quality value is associated with a bit-transition error matrix.

9. The apparatus of claim 1 wherein the optical transmitter comprises a laser device.

10. The apparatus of claim 9 wherein the control module is configured to change one or more settings for the laser device based on received back-channel data embedded in the incoming electrical signals.

11. The apparatus of claim 10 wherein the one or more settings include a laser wavelength.

12. The apparatus of claim 1 wherein the optical transmitter comprises a modulator.

13. The apparatus of claim 12 wherein the control module is configured to change one or more settings for the modulator based on received back-channel data embedded in the incoming electrical signals.

14. The apparatus of claim 1 wherein the optical transmitter comprises a multiplexer, the control module being configured to change one or more settings for the multiplexer based on received back-channel data embedded in the incoming electrical signals.

15. The apparatus of claim 14 wherein the multiplexer comprises a delay line interferometer (DLI), the DLI being configured to operate at a tuning parameter based on back-channel data and/or near-end data.

* * * * *